(12) United States Patent
Welicki et al.

(10) Patent No.: US 10,078,411 B2
(45) Date of Patent: Sep. 18, 2018

(54) ORGANIZATION MODE SUPPORT MECHANISMS

(71) Applicant: Microsoft Technology Licensing, LLC, Redmond, WA (US)

(72) Inventors: Leon Ezequiel Welicki, Issaquah, WA (US); Mo Wang, Seattle, WA (US); Christopher Scrosati, Redmond, WA (US); Kristofer John Owens, Seattle, WA (US); Jon Harris, Sammamish, WA (US); Jonah Bush Sterling, Seattle, WA (US); Dina-Marie Ledonna Supino, Seattle, WA (US); Vishal R. Joshi, Redmond, WA (US); Jesse David Francisco, Lake Stevens, WA (US); Stephen Michael Danton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 14/310,617

(22) Filed: Jun. 20, 2014

(65) Prior Publication Data

US 2015/0286343 A1 Oct. 8, 2015

Related U.S. Application Data

(60) Provisional application No. 61/974,191, filed on Apr. 2, 2014.

(51) Int. Cl.
*G06F 3/00* (2006.01)
*G06F 3/0481* (2013.01)
(Continued)

(52) U.S. Cl.
CPC .......... *G06F 3/0481* (2013.01); *G06F 3/0486* (2013.01); *G06F 3/04812* (2013.01); *G06F 3/04817* (2013.01); *G06F 3/04847* (2013.01)

(58) Field of Classification Search
CPC .............. G06F 3/0481; G06F 3/04847; G06F 3/04812; G06F 3/04817; G06F 3/0486
See application file for complete search history.

(56) References Cited

U.S. PATENT DOCUMENTS

| 5,123,087 A | 6/1992 | Newell et al. |
| 5,204,947 A * | 4/1993 | Bernstein .......... G06F 17/30014 345/163 |

(Continued)

FOREIGN PATENT DOCUMENTS

| JP | 07021241 | 1/1995 |
| JP | 08096153 | 4/1996 |

(Continued)

OTHER PUBLICATIONS

"How to Use the New Youtube," Dec. 3, 2012, https://www.youtube.com/watch?v=r0272TInjR4, 1 page.*

(Continued)

*Primary Examiner* — Kieu Vu
*Assistant Examiner* — Asteway T Gattew
(74) *Attorney, Agent, or Firm* — Workman Nydegger

(57) ABSTRACT

An organization mode in a user interface that displays multiple user interface elements. The multiple user interface elements fit over a grid positions that are at least conceptually imposed over a canvas. In organization mode, the grid positions are displayed, allowing the user to more easily see where user interface elements may be placed. As the user moves and/or resizes a user interface element, one or more corresponding grid positions are highlighted to show where the user interface element would be placed if the move or (Continued)

resize operation were to conclude at that moment. The organization mode may also provide a contextual actions menu with respect to a particular user interface element. The contextual actions menu includes multiple organization mode commands, including one or more that may be directed selected from the contextual actions menu to invoke the command.

22 Claims, 10 Drawing Sheets

(51) Int. Cl.
    *G06F 3/0484*     (2013.01)
    *G06F 3/0486*     (2013.01)

(56) References Cited

U.S. PATENT DOCUMENTS

| | | | |
|---|---|---|---|
| 5,226,117 A * | 7/1993 | Miklos | G06F 9/4443 715/202 |
| 5,471,578 A | 11/1995 | Moran et al. | |
| 5,490,241 A | 2/1996 | Mallgren et al. | |
| 5,555,357 A | 9/1996 | Fernandes et al. | |
| 5,565,888 A | 10/1996 | Selker | |
| 5,613,058 A | 3/1997 | Koppolu et al. | |
| 5,644,737 A | 7/1997 | Tuniman et al. | |
| 5,694,563 A | 12/1997 | Belfiore et al. | |
| 5,809,267 A | 9/1998 | Moran et al. | |
| 5,844,558 A | 12/1998 | Kumar et al. | |
| 5,861,886 A | 1/1999 | Moran et al. | |
| 5,886,694 A | 3/1999 | Breinberg et al. | |
| 5,892,554 A | 4/1999 | DiCicco et al. | |
| 6,034,684 A | 3/2000 | Proehl et al. | |
| 6,065,021 A | 5/2000 | George | |
| 6,425,121 B1 | 7/2002 | Phillips | |
| 6,426,761 B1 | 7/2002 | Kanevsky | |
| 6,437,804 B1 | 8/2002 | Ibe et al. | |
| 6,525,749 B1 | 2/2003 | Moran et al. | |
| 6,801,200 B1 | 10/2004 | Prakriya et al. | |
| 7,058,653 B2 | 6/2006 | Okamoto et al. | |
| 7,071,952 B1 | 7/2006 | Ternulf et al. | |
| 7,096,454 B2 | 8/2006 | Damm et al. | |
| 7,233,341 B1 | 6/2007 | Sauervrei | |
| 7,253,823 B2 | 8/2007 | Wong et al. | |
| 7,318,199 B2 | 1/2008 | Nickolayev et al. | |
| 7,320,120 B2 | 1/2008 | Rajarajan et al. | |
| 7,356,774 B2 | 4/2008 | Shah et al. | |
| 7,483,028 B2 | 1/2009 | Wong et al. | |
| 7,600,197 B2 | 10/2009 | Gourdol et al. | |
| 7,657,840 B2 | 2/2010 | Gibson et al. | |
| 7,725,841 B2 | 5/2010 | Michelman et al. | |
| 8,209,630 B2 | 6/2012 | Thimbleby et al. | |
| 8,225,224 B1 | 7/2012 | Robertson et al. | |
| 8,438,500 B2 | 5/2013 | Rapp et al. | |
| 9,043,722 B1 * | 5/2015 | Holt | G06F 3/04842 715/781 |
| 2002/0078433 A1 | 6/2002 | Rajarajan et al. | |
| 2002/0120784 A1 | 8/2002 | Rajarajan et al. | |
| 2003/0072486 A1 | 4/2003 | Loui et al. | |
| 2003/0214536 A1 | 11/2003 | Jarrett et al. | |
| 2004/0010776 A1 | 1/2004 | Shah | |
| 2005/0039145 A1 | 2/2005 | Diering et al. | |
| 2005/0044089 A1 | 2/2005 | Wu | |
| 2005/0050053 A1 | 3/2005 | Thompson | |
| 2005/0057575 A1 | 3/2005 | Nickolayev et al. | |
| 2005/0102634 A1 | 5/2005 | Sloo | |
| 2005/0195217 A1 | 9/2005 | Robertson et al. | |
| 2005/0243373 A1 | 11/2005 | Silverbrook et al. | |
| 2005/0257157 A1 | 11/2005 | Gilboa et al. | |
| 2006/0143570 A1 | 6/2006 | Washington et al. | |
| 2006/0146059 A1 * | 7/2006 | Inoue | G06F 3/0481 345/546 |
| 2006/0150169 A1 | 7/2006 | Cook et al. | |
| 2006/0164682 A1 | 7/2006 | Lev | |
| 2006/0174568 A1 | 8/2006 | Kinoshita et al. | |
| 2006/0212790 A1 | 9/2006 | Perantatos et al. | |
| 2006/0242557 A1 * | 10/2006 | Nortis, III | G06F 3/0482 715/234 |
| 2006/0282790 A1 * | 12/2006 | Matthews | G06F 9/4443 715/767 |
| 2007/0101321 A1 | 5/2007 | Mahoney et al. | |
| 2007/0136351 A1 | 6/2007 | Dames et al. | |
| 2007/0157096 A1 | 7/2007 | Keren et al. | |
| 2007/0260332 A1 | 11/2007 | Torgerson | |
| 2007/0266307 A1 | 11/2007 | Panditharadhya et al. | |
| 2008/0012859 A1 | 1/2008 | Saillet et al. | |
| 2008/0022215 A1 | 1/2008 | Lee et al. | |
| 2008/0036784 A1 | 2/2008 | Behar et al. | |
| 2009/0132942 A1 * | 5/2009 | Santoro | G06F 3/0481 715/765 |
| 2009/0158200 A1 | 6/2009 | Palahnuk et al. | |
| 2009/0228786 A1 | 9/2009 | Danton et al. | |
| 2009/0319939 A1 | 12/2009 | Danton et al. | |
| 2009/0327954 A1 | 12/2009 | Danton et al. | |
| 2010/0188410 A1 | 7/2010 | Gilbert et al. | |
| 2011/0016425 A1 * | 1/2011 | Homburg | G06F 3/0482 715/811 |
| 2011/0161827 A1 | 6/2011 | Dedis et al. | |
| 2012/0044172 A1 * | 2/2012 | Ohki | G06F 3/04883 345/173 |
| 2013/0019175 A1 | 1/2013 | Kotler et al. | |
| 2013/0067412 A1 * | 3/2013 | Leonard | G06F 3/0482 715/835 |
| 2013/0086498 A1 * | 4/2013 | Eskander | G06F 3/0481 715/765 |
| 2013/0187866 A1 * | 7/2013 | Kim | G06F 3/0488 345/173 |
| 2013/0246955 A1 | 9/2013 | Schwesig et al. | |
| 2014/0351015 A1 * | 11/2014 | Ehn | G06Q 30/02 705/7.31 |
| 2014/0351727 A1 | 11/2014 | Danton et al. | |

FOREIGN PATENT DOCUMENTS

| | | |
|---|---|---|
| JP | 08221500 | 8/1996 |
| JP | 2002208021 | 7/2002 |
| JP | 2011526039 | 9/2011 |
| KR | 20080044827 | 5/2008 |
| WO | 2007098243 | 8/2007 |
| WO | 2009158219 | 12/2009 |
| WO | 2013157013 A1 | 10/2013 |

OTHER PUBLICATIONS

"International Preliminary Report on Patentability Issued in PCT Application No. PCT/US2015/023448", dated Jul. 4, 2016, 8 Pages.
"Second Written Opinion Issued in PCT Application No. PCT/US2015/023448", dated Mar. 15, 2016, 7 Pages.
"Office Action Issued in Canadian Patent Application No. 2,724,684", dated Feb. 6, 2017, 5 Pages.
Notice of Allowance dated May 16, 2017 cited in U.S. Appl. No. 14/453,044.
Jiang, Yi-Feng, "Shape Alignment by Learning a Landmark-PDM Coupled Model", Proceedings of the 18th International Conference on Pattern Recognition (ICPR '06), Aug. 2006, IEEE, 4 pages.
MSDN, "Using Alignment Boxes to Snap Shapes to a Grid", 2008 Microsoft Corporation, 3 pages.
MSDN, "Working with Shape Layers", 2008 Microsoft Corporation, 5 pages.
Notice of Allowance Issued in Japanese Patent Application No. 2011-516434, dated Apr. 28, 2015, 3 Pages.
Third Office Action Received for Chinese Patent Application No. 200980124800.1, dated Sep. 2, 2015, 6 Pages.
"Office Action Issued in Korean Application No. 10-2010-7029202", dated Jan. 14, 2016, 10 Pages.
"Office Action Issued in Canada Application No. 2,724,684", dated Feb. 17, 2016, 4 Pages.
"Office Action Issued in Canadian Patent Application No. 2,724,684", dated Jun. 23, 2016, 5 Pages.

(56) References Cited

OTHER PUBLICATIONS

"Supplementary Search Report Issued in European Patent Application No. 09770753.3", dated Aug. 4, 2016, 7 Pages.
"Microsoft Word 2007, released Nov. 30, 2006, screenshot printout" pp. 1-5.
"BET: PowerPoint-Diagrams-Radial Diagrams" Date: Oct. 17, 2006, pp. 1-2.
"Microsoft Office Visio 2007 Step by Step" by Judy Lemke, Feb. 14, 2007.
Venkatrao, "SqL/CLI A New Binding Style for SQL" SIGMOD Record, vol. 24, No. 4, Dec. 1995, pp. 72-77.
Moustakas et al. "Master-Piece: A Multimodal (Gesture + Speech) Interface for 3D Model Search and Retrieval Integrated in a Virtual Assembly Application" eNTERFACE 2005 The Summer Workshop on Multimodal Interfaces, Jul. 18-Aug. 12, pp. 62-75.
Zhao et al. "Incremental Recognition in Gesture-based and Syntax-Directed Diagram Editors" Interchi '93, 1998 ACM, pp. 95-100.
Laviola Jr. et al. "MathPad2: A System for the Creation and Exploration of Mathematical Sketches" 2004 ACM, pp. 432-440.
Henry et al. "Integrating Gesture and Snapping into a User Interface Toolkit" 1990 ACM, pp. 112-122.
U.S. Appl. No. 12/045,517, dated Apr. 14, 2011, Office Action.
U.S. Appl. No. 12/163,352, dated Jul. 26, 2011, Office Action.
U.S. Appl. No. 12/163,352, dated Feb. 2, 2012, Office Action.
U.S. Appl. No. 12/045,517, dated Dec. 6, 2012, Office Action.
U.S. Appl. No. 12/045,517, dated May 30, 2013, Office Action.
U.S. Appl. No. 12/163,352, dated Sep. 13, 2013, Office Action.
U.S. Appl. No. 12/045,517, dated Sep. 20, 2013, Office Action.
U.S. Appl. No. 12/045,517, dated Feb. 26, 2014, Office Action.
U.S. Appl. No. 12/163,352, dated Apr. 24, 2014, Notice of Allowance.
"International Search Report and Written Opinion Issued in PCT Application No. PCT/US2015/023448", dated Jun. 9, 2015, 11 Pages.
"UI Element Guidelines: Menus", Sep. 26, 2011 Available at: https://developer.apple.com/library/mac/documentation/userexperience/conceptual/applehiguidelines/Menus/Menus.html.

\* cited by examiner

ORGANIZATION MODE SUPPORT MECHANISMS

CROSS REFERENCE TO RELATED APPLICATIONS

This application claims the benefit of U.S. Provisional Application Ser. No. 61/974,191, filed Apr. 2, 2014, which provisional patent application is incorporated herein by reference in its entirety.

BACKGROUND

A computing system often displays user interface elements called controls that the user may interact with to cause the computing system to execute respective operations, or through which the user may visualize underlying information. A common form of a user interface element is a tile or icon. For instance, in a desktop area or start area, various tiles or icons may be laid out, awaiting selection by a user, or displaying information to a user.

During normal mode, such controls may be invoked to execute underlying operations. However, many systems allow the user to select an organization mode, in which typically the user interface elements are no longer selectable to perform underlying operations. Instead, the user interface elements may be moved around, repositioned, deleted, resized, and so forth, allowing the user to organize his or her workspace.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein provide for the supporting of an organization mode in a user interface that displays multiple user interface elements.

In accordance with a first aspect described herein, the multiple user interface elements fit over a grid positions that are at least conceptually imposed over a canvas. Each of the user interface elements occupies one or more of the grid positions and has boundaries corresponding to boundaries between grid positions. The system detects that the user interface is to enter an organization mode in which one or more of the user interface elements may be organized on the user interface. For instance, the user might make an explicit gesture recognized by the system as a user intent to enter organization mode. In response, the grid positions are displayed on the canvas. This allows the user to more easily see, during organization mode, where user interface elements may be placed. This is especially useful when the user interfaces may take on a predetermined number of combinations of shapes and sizes, each combination fittable over one or more grid positions. In some embodiments, as the user moves and/or resizes a user interface element, one or more corresponding grid positions are highlighted to show where the user interface element would be placed if the move or resize operation were to conclude at that moment.

In accordance with a second aspect described herein, while in organization mode, a contextual actions menu is caused to appear with respect to a particular user interface element. The contextual actions menu includes multiple organization mode commands, including one or more that may be directed selected from the contextual actions menu to invoke the command. For instance, perhaps those organization mode commands that are more frequently performed in organization mode (such as pin or unpin) might be directly invoked from the contextual actions menu, while other less frequently invoked organization mode commands may be reachable from the contextual actions menu, but not directly invoked.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
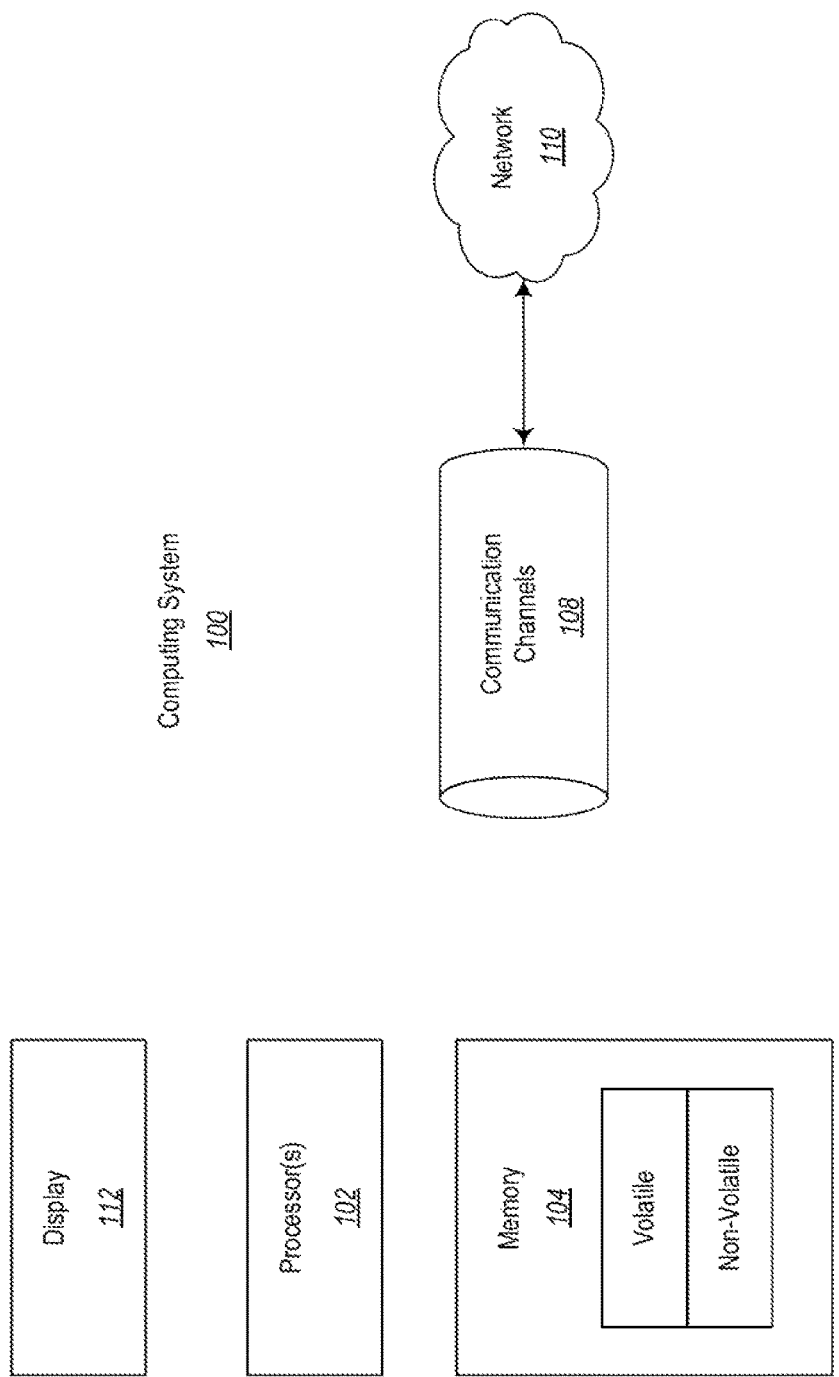
FIG. 1 illustrates an example computing system in which the principles described herein may be employed.

At least some embodiments described herein provide for the supporting of an organization mode in a user interface that displays multiple user interface elements.

In accordance with a first aspect described herein, the multiple user interface elements fit over a grid positions that are at least conceptually imposed over a canvas. Each of the user interface elements occupies one or more of the grid positions and has boundaries corresponding to boundaries between grid positions. The system detects that the user interface is to enter an organization mode in which one or more of the user interface elements may be organized on the user interface. For instance, the user might make an explicit gesture recognized by the system as a user intent to enter organization mode. In response, the grid positions are displayed on the canvas. This allows the user to more easily see, during organization mode, where user interface elements may be placed. This is especially useful when the user interfaces may take on a predetermined number of combinations of shapes and sizes, each combination fittable over one or more grid positions. In some embodiments, as the user moves and/or resizes a user interface element, one or more corresponding grid positions are highlighted to show where the user interface element would be placed if the move or resize operation were to conclude at that moment.

In accordance with a second aspect described herein, while in organization mode, a contextual actions menu is caused to appear with respect to a particular user interface element. The contextual actions menu includes multiple organization mode commands, including one or more that may be directed selected from the contextual actions menu to invoke the command. For instance, perhaps those organization mode commands that are more frequently performed in organization mode (such as pin or unpin) might be directly invoked from the contextual actions menu, while other less frequently invoked organization mode commands may be reachable from the contextual actions menu, but not directly invoked.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112 for displaying user interfaces such as those described herein.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
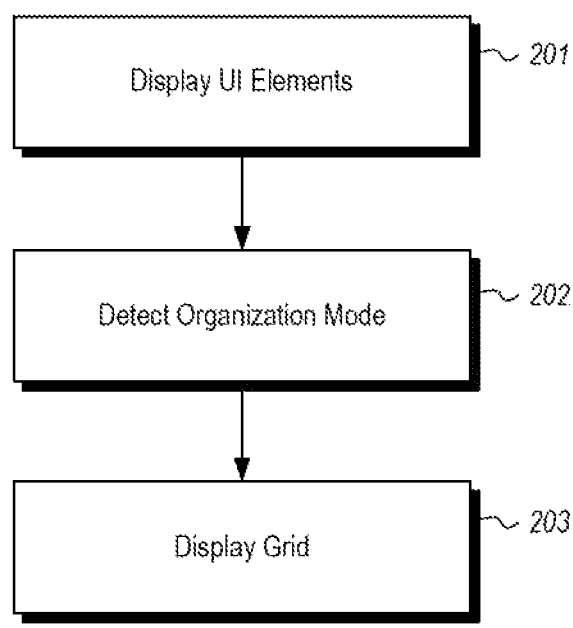
FIG. 2 illustrates a flowchart of a method for supporting an organization mode in which multiple user interface elements may be organized within a user interface.

FIG. 2 illustrates a flowchart of a method 200 for supporting an organization mode in which multiple user interface elements may be organized within a user interface. The user interface elements are displayed on the user interface (act 201). In some embodiments, the multiple user interface elements are displayed so as to conform to a grid pattern. The grid pattern may be conceptual in that it may not be always displayed. The grid pattern has multiple grid positions on a canvas. For instance, the grid positions may each be rectangular or square. Each user interface element is fitted to the one or more grid positions in that the user interface element occupies the one or more grid positions and has boundaries corresponding to the boundaries of the one or more grid positions. For instance, each of the user interface elements has one of a set of predetermined combinations of shape and size, each combination allowing the user interface element to fit over one or more grid positions.

Figure 3:
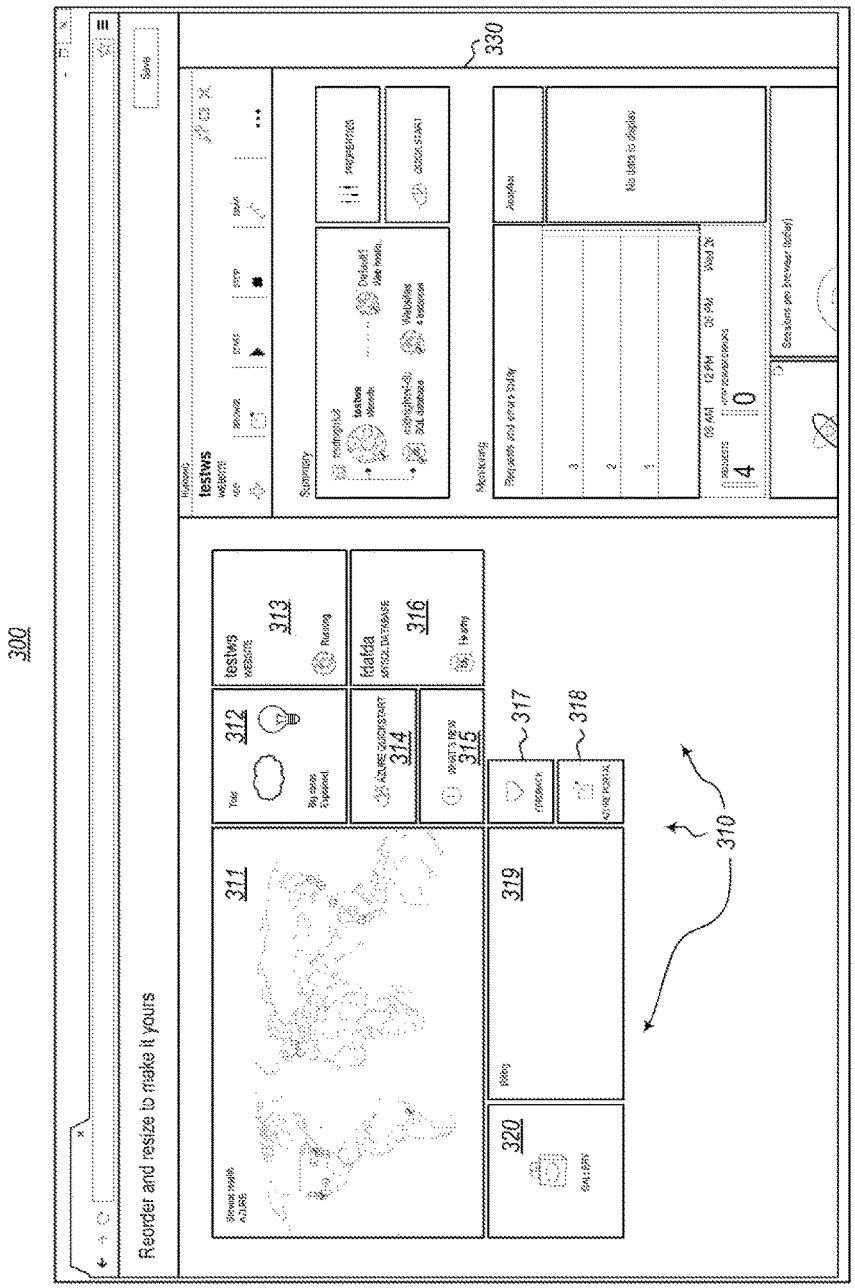
FIG. 3 illustrates a user interface in which there are multiple user interface elements positioned to fit a conceptual grid pattern.

For instance, FIG. 3 illustrates a user interface in which there are ten user interface elements 311 through 320 positioned in a start board 310. The user interface elements 317 and 318 are sized to be the smallest unit grid size being one grid unit wide by one grid unit in height. The user interface elements 314 and 315 are each two grid units wide by one grid unit high. The user interface elements 312, 313, 316 and 320 are each two grid units wide by two grid units high. The user interface element 319 is four grid units wide by two grid units high. The grid unit 311 is six grid units wide by four grid units high. When each of the predetermined combination of shape and size may fit well over a grid pattern, the various user interface elements may be fitted well over the grid pattern, with the boundary between user interface elements corresponding to boundaries between grid positions. In the illustrated embodiments, each of the user interface elements 311 through 320 are rectangular and being some positive integer multiple (1, 2, 3 and so forth) of a grid unit wide, and some positive integer multiple (1, 2, 3 and so forth) of a grid unit high.

The user interface 300 also shows a user interface element 330 that is outside of the start board 310. In one embodiment, the user interface 300 shows a portion of an extensible canvas that is extendible in an extendable dimension (e.g., horizontally. As new user interface elements are added to the canvas by selection of a current user interface element in the canvas, the canvas may extend in an extendable direction (e.g., rightward) in the extensible dimension. Accordingly, the user interface element 330 might be caused to appear when the user selects one of the user interface elements in FIG. 3.

Referring back to FIG. 2, while the user interface elements are still being displayed (in act 201), the computing system (e.g., the computing system 100 of FIG. 1) detects a user instruction (act 202) representing an intent to organize one or more of the user interface elements on the canvas. For instance, the computing system may detect an instruction to enter an organization mode for the user interface. In the organization mode, the user interface elements may be organized (e.g., moved, resized, copied, or the like) on the canvas in a manner not permitted outside of organization mode.

Figure 4:
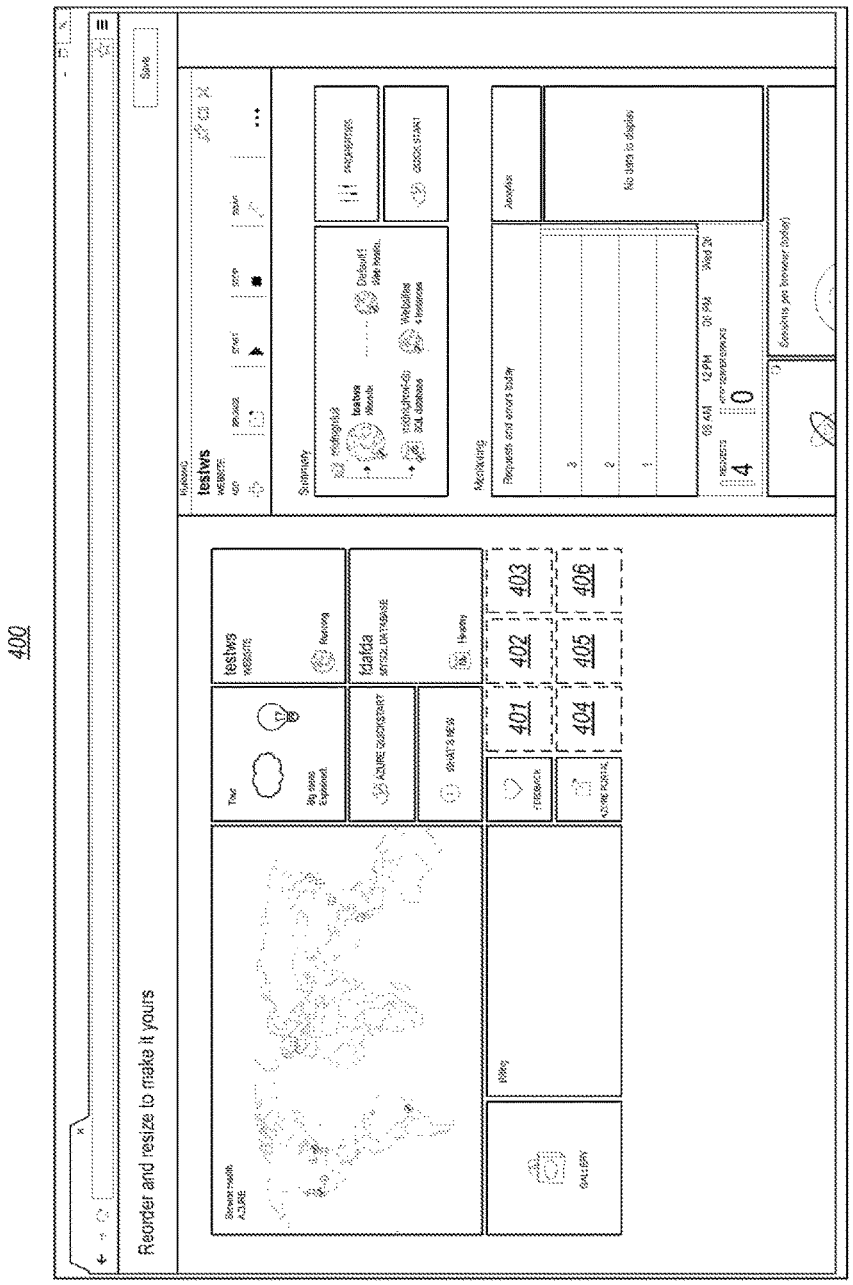
FIG. 4 illustrates a user interface that is similar to the user interface of FIG. 3, except now six unoccupied grid positions are illustrated.

In response to this user instruction, the user interface shows at least some of the grid positions to be displayed (act 203). For instance, FIG. 4 illustrates a user interface 400 that is similar to the user interface 300 of FIG. 3, except now six unoccupied grid positions 401 through 406 are illustrated (and the previously labelled elements of FIG. 3 are not labelled in FIG. 3 to avoid congested labels). Comparing FIG. 4 to FIG. 3, the grid positions were not displayed before entering organization mode. In some embodiments, the display of the grid positions may be delayed until the user actually performs some organization (e.g., moving, resizing and/or copying) of one or more user interface elements. For instance, the grid positions may be displayed when the user begins moving or resizing a user interface element. To further emphasize that the use interface 400 is in organization mode, the user interface 400 may be darkened as compared to the user interface 300, although this darkening is not illustrated in FIG. 4.

Figure 5:
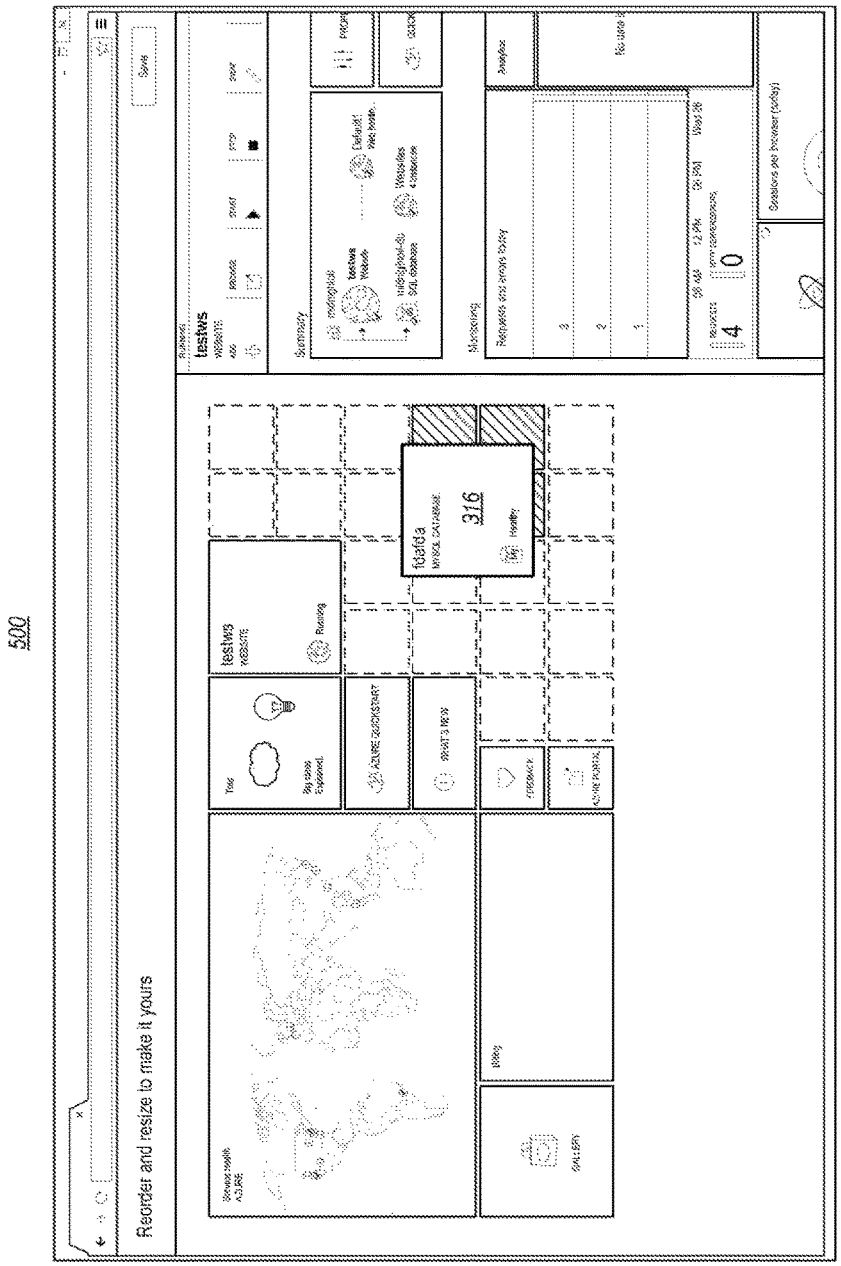
FIG. 5 illustrates a user interface that is similar to the user interface of FIG. 4, except that now the user is moving a user interface element.

FIG. 5 illustrates a user interface 500 that is similar to the user interface 400 of FIG. 4, except that now the user is moving the user interface element 316. Here, two changes have happened in response. First, additional unoccupied grid positions are illustrated due to a) the availability of the previous four grid positions where the user interface element 316 originated from, and b) the availability of additional unoccupied grid positions in the direction (rightward) that the user interface element 316 has been moved. Second, the unoccupied grid positions are highlighted (as represented by diagonal lined fill and solid line boundaries) to represents where the user interface element 316 would be placed on the user interface element 316 were to be dropped. As previously mentioned, in organization mode, the user interface elements may be darkened to emphasize that the user interface elements are blocked from performing their normal operations. Instead, they can just be organized. However, when a user interface element is being organized, perhaps there is also some visualization assigned to that user interface element also, to emphasize that it is the subject of organization. For instance, perhaps user interface element 316 is no longer darkened, thus giving visual attention to the user interface element 316 being organized.

The analysis of which of the unoccupied grid positions should be highlighted may be repeatedly performed as the move operation continues, thus giving the user a real-time impression of the effect of dropping the user interface element at any given point in time. In this example, only the user interface element 316 is being moved, but the principles may also apply if multiple user interface elements are moved in a group.

Figure 6:
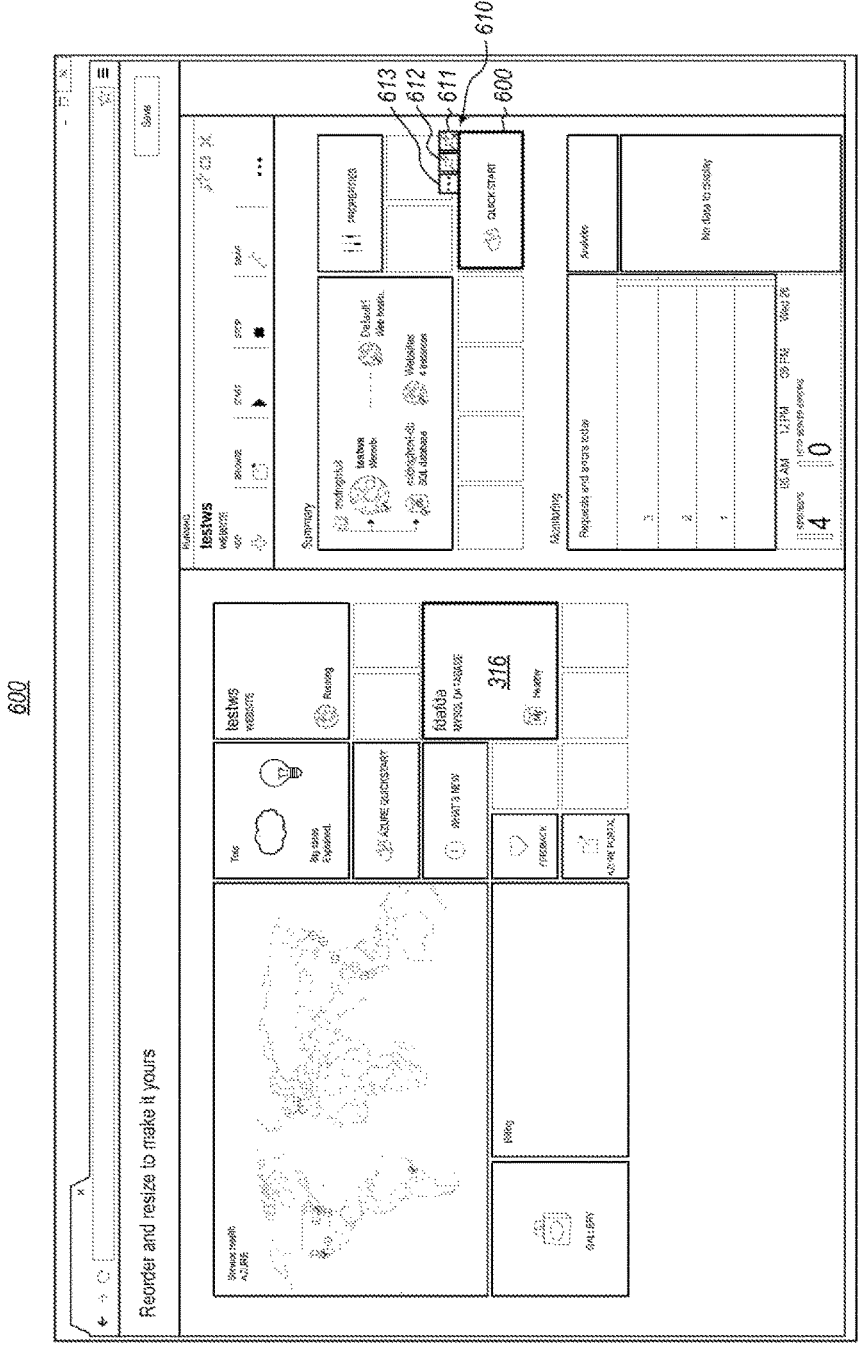
FIG. 6 illustrates a user interface that is similar to the user interface of FIG. 5, except that rather than the user interface element being dropped to the unoccupied grid positions highlighted in FIG. 5, the user interface element snaps to a position adjacent the existing user interface elements in the start board.

In FIG. 5, the highlighted grid positions are underneath the user interface element 316 being moved. However, there may be times when the highlighted grid positions are not underneath the user interface element 316 being moved. For instance, to keep the start board in condensed fashion with user interface elements being close together, the computing system may snap the user interface element 316 to be adjacent the other user interface elements in the start board that are not being moved. For instance, FIG. 6 illustrates a user interface 600 that is similar to the user interfaced 500 of FIG. 5, except that rather than the user interface element 316 being dropped to the unoccupied grid positions highlighted in FIG. 5, the user interface element 316 snaps to a position adjacent the existing user interface elements in the start board. The user interface element may also be moved to be a constituent part of other user interface elements, such as the user interface element 330 of FIG. 3.

The visualized unoccupied grid positions may also be helpful when resizing one or the user interface elements. When resizing, the unoccupied user interface elements that would be occupied by the resized user interface element may also be highlighted. The analysis of which of the unoccupied grid positions should be highlighted may be repeatedly performed as the resize operation continues, thus giving the user a real-time impression of the effect of resizing of the user interface element at any given point in time.

Figure 7:
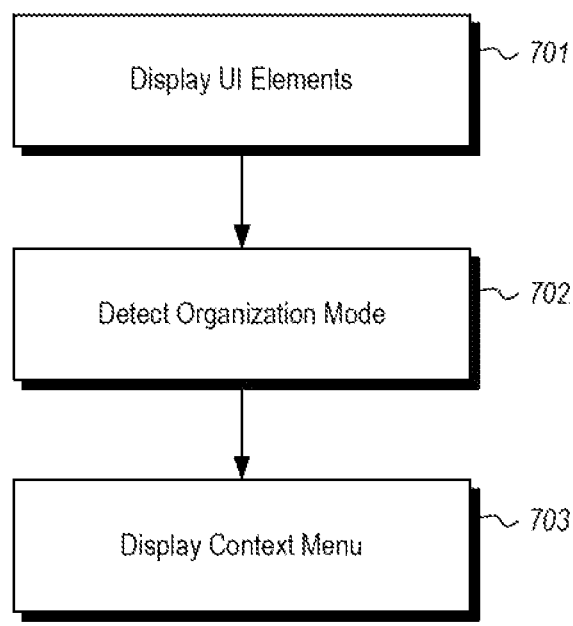
FIG. 7 illustrates another flowchart of a method for supporting an organization mode in which user interface elements may be organized within a user interface.

FIG. 7 illustrates another flowchart of a method 700 for supporting an organization mode in which user interface elements may be organized within a user interface. Again, the system displays multiple user interface elements on a user interface (act 701). In this broader embodiment, there is no requirement that the user interface elements have particular shapes and sizes, although FIGS. 6 and 8 through 10 will illustrates examples in which the user interface elements do have predetermined combinations of shape and size that fit into the same grid pattern.

Again, the user interface enters organization mode (act 702) in the user interface and while displaying the user interface elements. FIG. 6 again illustrates an example of the user interface elements in organization mode. The organization mode may be entered at the instruction of the user and/or upon the occurrence of one or more other events.

A contextual actions menu is then caused to appear with respect to a particular user interface element (act 703). For instance, referring to FIG. 6, suppose that the user interface element 601 is the particular user interface element which has its contextual actions menu 610 caused to appear. The contextual actions menu of an element may be caused to appear for a particular user interface element in response to a user instructions to display the contextual actions menu (such as the selection of the user interface element while in organization mode) and/or in response to one or more other events. In one embodiment, the contextual actions menu that is caused to appear with respect to a particular user interface element when the user interface is in organization mode, is different that the contextual actions menu that would appear with respect to the particular user interface element when the user interface is not in organization mode. For instance, the available commands may be at least partially different in organization mode as compared to a mode (e.g., a normal mode) that is not in the organization mode.

The contextual actions menu 610 is illustrated as having three organization mode commands. Two of the organization commands may be directly selected from the contextual actions menu. For instance, the user might directly select the pin command 611 to pin the user interface element to a portion of the user interface (such as the start board 310). The user might also directly select the unpin command 612 to unpin the user interface element from a portion of the user interface. Direct commands may be disabled depending on the circumstances. For instance, the pin command 611 may be disabled and not visualized if the user interface element 610 is already pinned to the start board. Likewise, the unpin command 612 may be disabled and not visualized if the user interface element 620 is not pinned to the start board.

The commands that may be directly invoked from the context menu 610 may, for instance, be the commands that are more commonly used. For instance, the system may cause the commands that are more commonly used in general to be displayed. On the other hand, the system may more proactively monitor the usage of a given user, and provide direct commands on the context menu for those commands that are more commonly performed in organization mode by the given user. For instance, if a given user performs resizing to a particular size more often, a resize control may be added to the contextual actions menu for direct selection.

Figure 8:
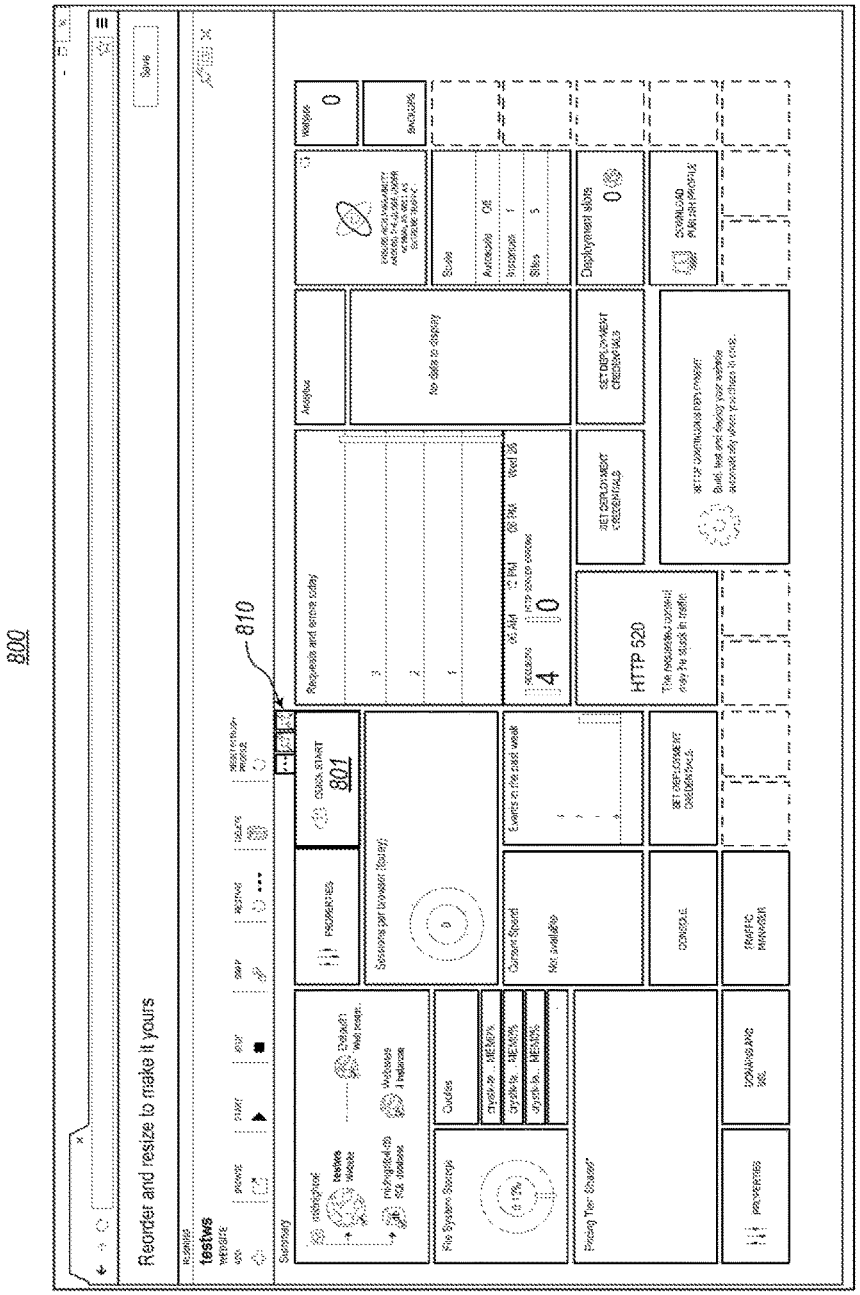
FIG. 8 illustrates a user interface in organization mode and in which a selected user interface element is in a different position and has a similar contextual actions menu.

FIG. 8 illustrates a user interface 800 in organization mode and in which a user interface element 801 is in a different user interface element that is maximized to occupy much of the current view of the display. This emphasizes that the context menu behavior may be the same regardless of the context of the user navigation.

Figure 9:
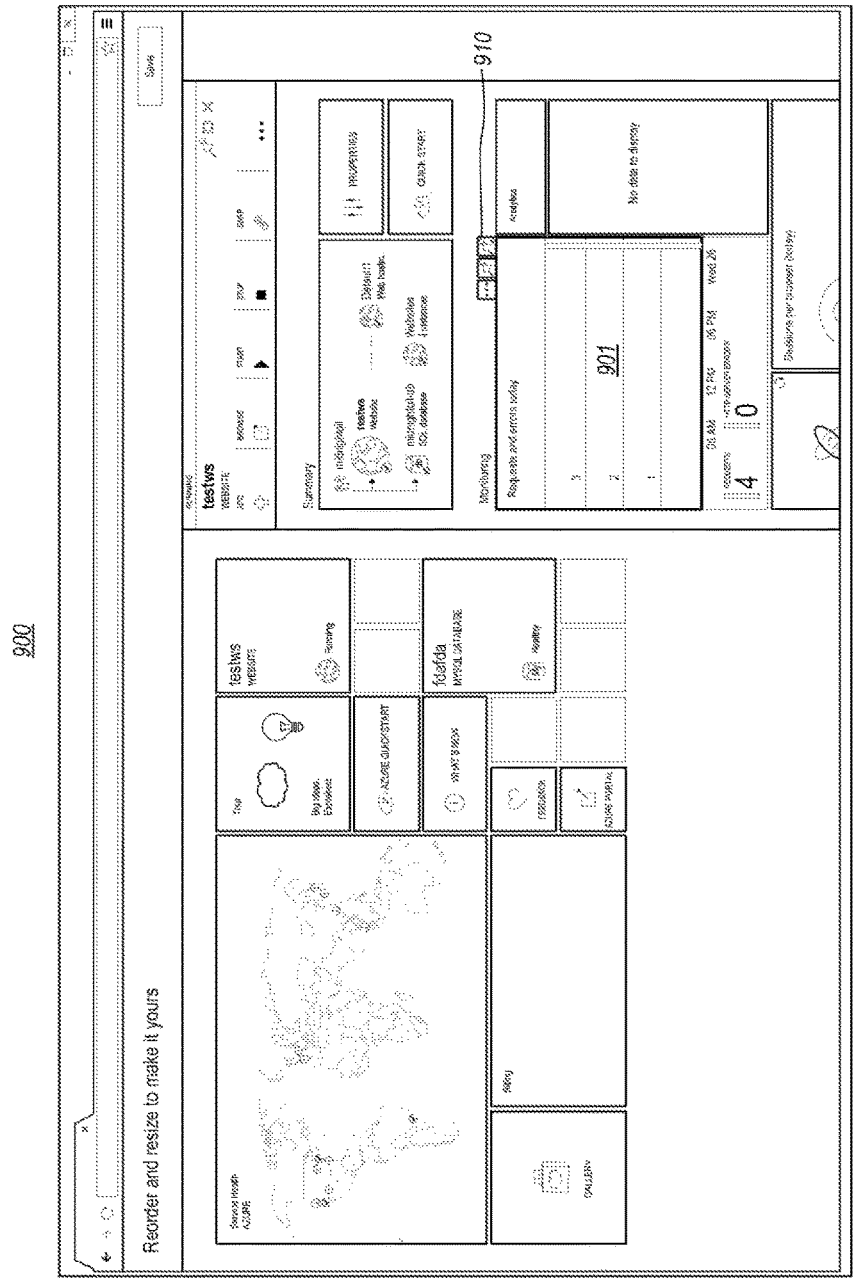
FIG. 9 illustrates a user interface in organization mode and in which a different type of user interface element has a similar contextual actions menu.

FIG. 9 illustrates a user interface 900 in organization mode and in which a different type of user interface element 901 has a similar contextual actions menu 910. This emphasizes that the contextual actions menu behavior may be consistent across different kinds of user interface elements.

Figure 10:
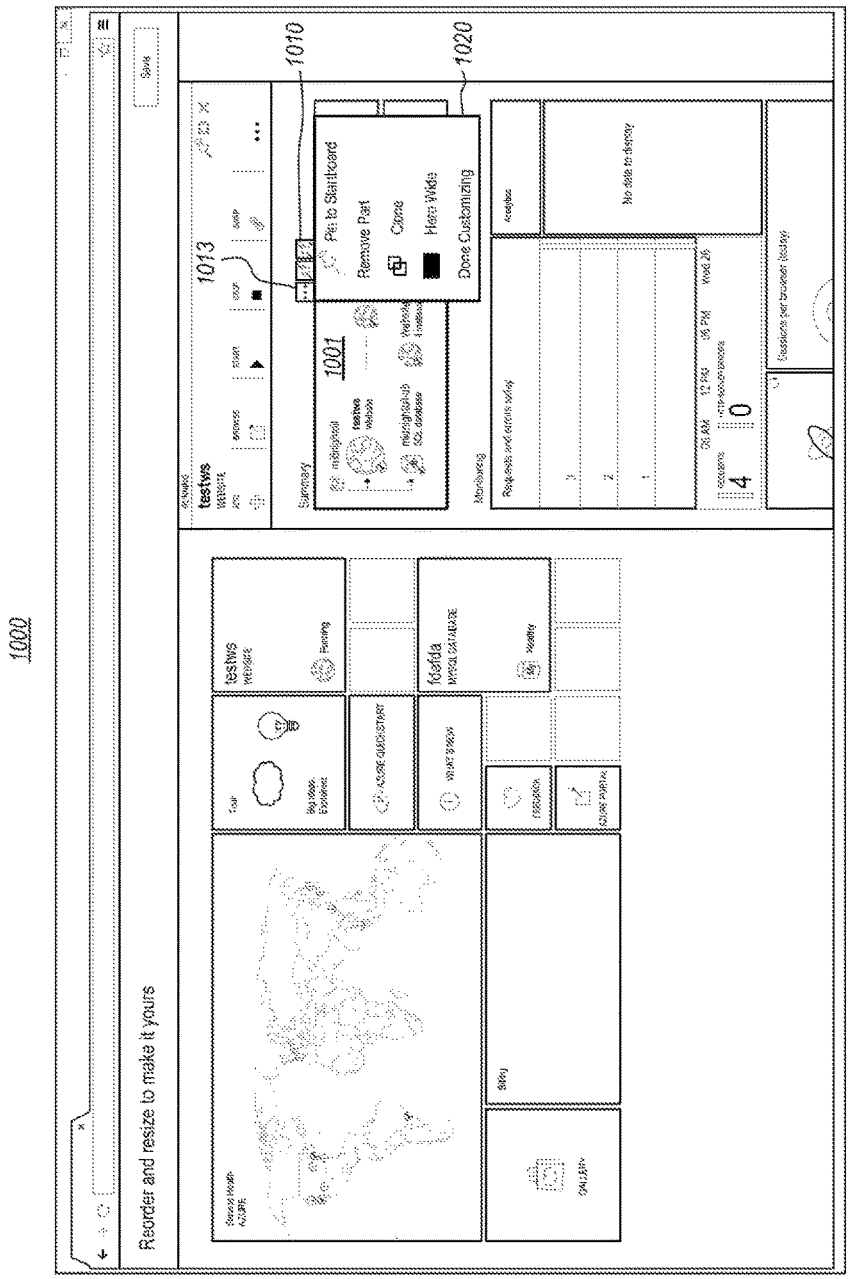
FIG. 10 illustrates a user interface in organization mode in which a user interface is illustrated, and which includes a contextual actions menu is illustrated.

FIG. 10 illustrates a user interface 1000 in organization mode in which a user interface 1001 is illustrated, and which includes a contextual actions menu 1010 is illustrated. The user has selected the other control 1013 thereby showing that could not be directly executed from the contextual actions menu 1010. Instead, the indirect contextual actions menu commands are executed from the drop down menu 1020. In this example, the user may select the pin command, the remove part command (which deletes the user interface element), the clone command (which copies an instance of the user interface element), a hero wide command (which resizes the user interface element to a predetermined size), and a done customizing command (which selects the user interface element).

Accordingly, the principles described herein provide support for organization mode of operation in systems that display multiple user interface elements that are to be organized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable physical storage media having stored thereon computer-executable instructions that are executable by one or more processors of a computing system to cause the computing system to perform a method for supporting an organization mode in which a plurality of user interface elements may be organized within a user interface, the method comprising:
　an act of displaying a canvas on the user interface, the canvas being subdivided into at least an extendable start board portion and a constituent element portion, the extendable start board portion being displayed simultaneously with the constituent element portion on the canvas, wherein:
　　upon selection of any one user interface element in the extendable start board portion, the constituent element portion is updated to include a group of user interface elements that each corresponds to the selected any one user interface element,
　　a size of the constituent element portion is dependent on a size of the extendable start board portion such that as the size of the extendable start board portion increases, the size of the constituent element portion decreases in response, and
　　when the size of the constituent element portion decreases, an appearance of at least some elements in the group of user interface elements included in the constituent element portion is progressively cutoff to coincide with the decreasing size of the constituent element portion;
　an act of displaying a plurality of user interface elements on the extendable start board portion of the canvas so as to conform to a grid pattern having a plurality of grid positions on the extendable start board portion, each of the plurality of user interface elements occupying one or more of the grid positions of the plurality of grid positions and having boundaries corresponding to boundaries between grid positions;
　an act of detecting a user instruction representing an intent to organize one or more of the plurality of user interface elements on the canvas, the user interface entering the organization mode after the user instruction is received;
　an act of causing an appearance of at least some remaining user interface elements in the plurality to change such that the appearances are deemphasized, the at least some remaining user interface elements being elements that were not associated with the user instruction;
　an act of causing at least some of the plurality of grid positions to be displayed in response to the act of detecting the user instruction; and
　while in the organization mode and in response to selecting a particular user interface element, an act of causing a contextual actions menu to appear for the particular user interface element, the contextual actions menu displaying a subset of available commands, the displayed subset of available commands being commands that have been previously identified as being commonly used by a user while the user interacts with the user interface in the organization mode, the contextual actions menu being displayed simultaneously with the particular user interface element.

2. The computer program product in accordance with claim 1, wherein the displayed subset of available commands includes a pin and unpin command.

3. The computer program product in accordance with claim 1, the act of detecting a user instruction comprising:
　an act of detecting a user instruction to move the one or more of the plurality of user interface elements on the canvas.

4. The computer program product in accordance with claim 3, the method further comprising:
　an act of detecting that a user is moving the one or more of the plurality of user interface elements; and
　for each of a plurality of instances during the user's detected moving of the one or more of the plurality of user interface elements, an act of highlighting one or more of the plurality of grid positions so that the highlighted one or more grid positions represents where the one or more of the plurality of user interface elements would be placed on the canvas if the one or more of the plurality of user interface elements were to be dropped at the corresponding instance of the plurality of instances.

5. The computer program product in accordance with claim 4, the highlighted one or more grid positions being underneath the one or more of the plurality of user interface elements for each of at least a majority of the plurality of instances.

6. The computer program product in accordance with claim 4, the highlighted one or more grid positions being adjacent another of the plurality of user interface elements, but not underneath the one or more of the plurality of user interface elements for each of at least a majority of the plurality of instances.

7. The computer program product in accordance with claim 1, the act of detecting a user instruction comprising:
　an act of detecting a user instruction to resize the one or more of the plurality of user interface elements on the canvas.

8. The computer program product in accordance with claim 7, the method further comprising:
　an act of detecting that a user is resizing the one or more of the plurality of user interface elements; and
　for each of one or more instances during the user's detected resizing of the one or more of the plurality of user interface elements, an act of highlighting one or more of the plurality of grid positions so that the highlighted one or more grid positions represents where the one or more of the plurality of user interface elements would be placed on the canvas if the one or more of the plurality of user interface elements were to be dropped at the corresponding instance of the one or more instances.

9. The computer program product in accordance with claim 1, each of the plurality of user interface elements having one of a set of predetermined allowable shapes and sizes, each of the predetermined allowable shapes and sizes fitting over one or more grid positions.

10. A method for supporting an organization mode in which a plurality of user interface elements may be organized within a user interface, the method comprising:
　an act of displaying a canvas on the user interface, the canvas being subdivided into at least an extendable start board portion and a constituent element portion, the extendable start board portion being displayed simultaneously with the constituent element portion on the canvas, wherein:
　　upon selection of any one user interface element in the extendable start board portion, the constituent element portion is updated to include a group of user interface elements that each corresponds to the selected any one user interface element, a size of the constituent element portion is dependent on a size of the extendable start board portion such that as the size of the extendable start board portion increases, the size of the constituent element portion decreases in response, and when the size of the constituent element portion decreases, an appearance of at least some elements in the group of user interface elements included in the constituent element portion is progressively cutoff to coincide with the decreasing size of the constituent element portion;

an act of displaying a plurality of user interface elements on the extendable start board portion of the canvas so as to conform to a grid pattern having a plurality of grid positions on the extendable start board portion, each of the plurality of user interface elements fitting over one or more of the grid positions of the plurality of grid positions;

an act of entering an organization mode in which the plurality of user interface elements may be organized on the canvas in a manner not permitted outside of the organization mode;

after detecting user input directed to at least one user interface element in the plurality while in the organization mode, an act of causing an appearance of at least some remaining user interface elements in the plurality to change such that the appearances are deemphasized, the at least some remaining user interface elements being elements that were not associated with the user input;

an act of causing at least some of the plurality of grid positions to be displayed on the canvas while in the organization mode; and while in the organization mode and in response to selecting a particular user interface element, an act of causing a contextual actions menu to appear for the particular user interface element, the contextual actions menu displaying a subset of available commands, the displayed subset of available commands being commands that have been previously identified as being commonly used by a user while the user interacts with the user interface in the organization mode, the contextual actions menu being displayed simultaneously with the particular user interface element.

11. A method in accordance with claim 10, wherein grid positions are not displayed on the canvas while not in organization mode.

12. The method of claim 10, wherein the act of causing the at least some of the plurality of grid positions to be displayed on the canvas while in the organization mode comprises:

causing a plurality of grid lines to appear on the canvas, the plurality of grid lines appearing on the canvas only after a user has initiated a move of the at least one user interface element.

13. The method of claim 10, wherein the method further comprises:

an act of detecting that a user has moved a first user interface element included within the plurality to a location that is not within a single grid position of a second user interface element; and in response to the first user interface element being placed in the location that is not within the single grid position of the second user interface element, an act of causing the first user interface element to be snapped to a new position that is within the single grid position of the second user interface element.

14. The method of claim 10, wherein the method further includes:

an act of selecting a group of user interface elements; and after selecting the group, an act of causing each user interface element in the group to be acted upon concurrently.

15. The method of claim 10, wherein the at least one user interface element is associated with a website, and wherein the method further comprises:

after detecting the user input directed to the at least one user interface element, an act of causing a new user interface element to be displayed, wherein the new user interface element was not displayed prior to detecting the user input.

16. The method of claim 15, wherein the new user interface element includes a start and a stop button associated with the website.

17. The method of claim 16, wherein the at least one user interface element displays a notification indicating that the at least one user interface element is associated with the website, and wherein the new user interface element also displays a similar notification.

18. The method of claim 10, wherein the act of entering the organization mode further includes causing the entire user interface to be darkened.

19. The method of claim 10, wherein the act of entering the organization mode further includes causing a plurality of dashed grid lines to appear.

20. The method of claim 10, wherein the subset of available commands that appear in the contextual actions menu when the organization mode is active is at least partially different than a different subset of commands that appear in the contextual actions menu when the organization mode is not active.

21. The method of claim 10, wherein when multiple user interface elements are selected, the multiple user interface elements are moveable as an entire group.

22. A computer-implemented method performed by one or more processors of a computing system which includes a memory having stored thereon computer-executable instructions that are executable by the one or more processors to cause the one or more processors to perform the computer-implemented method, which permits visualizing an organization mode in which a plurality of user interface elements may be organized within a user interface, the computer-implemented method comprising:

displaying a canvas on the user interface, the canvas being subdivided into at least an extendable start board portion and a constituent element portion, the extendable start board portion being displayed simultaneously with the constituent element portion on the canvas, wherein:

upon selection of any one user interface element in the extendable start board portion, the constituent element portion is updated to include a group of user interface elements that each corresponds to the selected any one user interface element, a size of the constituent element portion is dependent on a size of the extendable start board portion such that as the size of the extendable start board portion increases, the size of the constituent element portion decreases in response, and when the size of the constituent element portion decreases, an appearance of at least some elements in the group of user interface elements included in the constituent element portion is progressively cutoff to coincide with the decreasing size of the constituent element portion;

displaying a plurality of user interface elements on the extendable start board portion of the canvas, wherein the interface elements conform to a grid pattern having a plurality of grid positions on the extendable start board portion, each individual interface element occupying one or more of the grid positions and having boundaries corresponding to the boundaries of the one or more grid positions occupied by the individual interface element;

the one or more processors detecting at the interface an input representing an intent to organize one or more of the interface elements on the canvas;

in response to detecting said input representing an intent to organize one or more of the interface elements on the canvas, the one or more processors initiating an organization mode at the interface, wherein unoccupied grid positions of the canvas are displayed to permit visualization of where interface elements can be moved, added, enlarged or reduced in size, in order to facilitate visualizing organization of one or more interface elements on the interface, and wherein the one or more interface elements associated with the input are visually emphasized;

an act of causing an appearance of at least some remaining user interface elements in the plurality to change such that the appearances are deemphasized, wherein the at least some remaining user interface elements are elements that were not associated with the input, and wherein the appearances are deemphasized by becoming darker; and while in the organization mode and in response to selecting a particular user interface element, an act of causing a contextual actions menu to appear for the particular user interface element, the contextual actions menu displaying a subset of available commands, the displayed subset of available commands being commands that have been previously identified as being commonly used by a user while the user interacts with the user interface in the organization mode, the contextual actions menu being displayed simultaneously with the particular user interface element.

* * * * *